United States Patent
Phanopoulos et al.

(10) Patent No.: US 10,604,616 B2
(45) Date of Patent: Mar. 31, 2020

(54) INCORPORATION OF LIGNIN IN POLYURETHANE PRODUCTS

(71) Applicant: Huntsman International LLC, The Woodlands, TX (US)

(72) Inventors: Christopher Phanopoulos, Tervuren (BE); Griet Pans, Hoeleden (BE); Mathilde Teboul, Woluwe-Saint-Lambert (BE); Jorge Lima Garcia, Brussels (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 74 days.

(21) Appl. No.: 15/769,772

(22) PCT Filed: Sep. 29, 2016

(86) PCT No.: PCT/EP2016/073195
§ 371 (c)(1),
(2) Date: Apr. 20, 2018

(87) PCT Pub. No.: WO2017/067769
PCT Pub. Date: Apr. 27, 2017

(65) Prior Publication Data
US 2018/0312625 A1   Nov. 1, 2018

(30) Foreign Application Priority Data
Oct. 21, 2015   (EP) .................... 15190822

(51) Int. Cl.
| C08G 18/10 | (2006.01) |
| C08G 18/64 | (2006.01) |
| C08G 18/48 | (2006.01) |
| C09J 175/04 | (2006.01) |
| C08G 18/80 | (2006.01) |
| C08G 18/79 | (2006.01) |
| C08G 18/12 | (2006.01) |
| C08G 18/30 | (2006.01) |
| C08L 97/00 | (2006.01) |
| C09J 175/08 | (2006.01) |

(52) U.S. Cl.
CPC ......... *C08G 18/6492* (2013.01); *C08G 18/10* (2013.01); *C08G 18/12* (2013.01); *C08G 18/302* (2013.01); *C08G 18/4808* (2013.01); *C08G 18/4812* (2013.01); *C08G 18/4825* (2013.01); *C08G 18/4833* (2013.01); *C08G 18/4841* (2013.01); *C08G 18/797* (2013.01); *C08G 18/8019* (2013.01); *C08L 97/005* (2013.01); *C09J 175/04* (2013.01); *C09J 175/08* (2013.01)

(58) Field of Classification Search
USPC ......................................................... 527/401
See application file for complete search history.

(56) References Cited

U.S. PATENT DOCUMENTS

| 3,072,634 A | 1/1963 | Santelli |
| 3,519,581 A | 7/1970 | Moorer |
| 3,577,358 A | 5/1971 | Santelli |
| 4,100,016 A | 7/1978 | Diebold et al. |
| 4,764,596 A | 8/1988 | Lora et al. |
| 4,851,457 A | 7/1989 | Kurple |

FOREIGN PATENT DOCUMENTS

| CA | 2164490 A | 6/1996 |
| CZ | 304264 B | 2/2014 |
| FR | 2689366 A | 10/1993 |
| WO | 9534392 A | 12/1995 |
| WO | 9632444 A | 10/1996 |
| WO | 9951654 A | 10/1999 |
| WO | 2011097719 A | 8/2011 |
| WO | 2013179251 A | 12/2013 |
| WO | 2014044234 A | 3/2014 |
| WO | 2015055662 A | 4/2015 |

*Primary Examiner* — Terressa Boykin
(74) *Attorney, Agent, or Firm* — Huntsman International LLC; Robert Diaz (57) ABSTRACT

Composition comprising lignin dispersed in a polyisocyanate wherein the (d90) mean particle size of the dispersed lignin is less than 5 μm, preferably less than 2 μm, more preferably less than 1 μm and use of said composition in various polyurethane applications, in particular structural wood adhesives.

12 Claims, 1 Drawing Sheet

Figure 1: Illustration of method for preparation of gap filling lap joints (1 mm glue line)

Figure 2: Illustration of gap filling lap joint (1 mm glue line)

Figure 3: Orientation of growth rings in mini-glulam (red is resin)

Figure 4: 20wt% dried Organosolv lignin (MC 1%) dispersed in the polyol mixture

INCORPORATION OF LIGNIN IN POLYURETHANE PRODUCTS

CROSS-REFERENCE TO RELATED APPLICATIONS

This application is the National Phase of International Application PCT/EP2016/073195 filed Sep. 29, 2016 which designated the U.S. and which claims priority to European App. Serial No. 15190822.5 filed Oct. 21, 2015. The noted applications are incorporated herein by reference.

This invention relates to incorporation of lignin in polyurethane products, in particular in polyisocyanate compositions and the use of said lignin-based polyisocyanate and polyurethane products in various applications, in particular as structural wood adhesives.

Polyurethanes consist of polymers composed of a chain of organic units joined by urethane linkages resulting from the reaction between an isocyanate group and an isocyanate-reactive group, preferably a hydroxyl group. Industrially, polyurethane polymers are usually formed by reacting an isocyanate with a polyol wherein both the isocyanate and the polyol contain on average two or more functional groups per molecule.

Polyurethanes can be produced in many different forms from very low density foams to high performance composites and can thus be used in a multitude of applications. Examples of applications include flexible high-resilience foam seating, rigid foam insulation panels, electrical potting compounds, high performance adhesives, surface coatings, packaging, surface sealants and synthetic fibers to name just a few.

The polyols used in the production of polyurethanes generally originate from petroleum products. However, due to environmental issues, more and more industrial processes nowadays try to replace petroleum products by "greener" products originating from the biomass. Lignin, which is a polyol biopolymer which can be easily extracted from food-grade and non-food grade biomass, such as agricultural waste or biomass from forests, is seen as a good candidate to replace, at least in part, polyols resulting from petroleum products. The use of lignin, a known by-product of the pulp and paper industry, is attractive because it is less expensive than polyols derived from petroleum and may create a smaller environmental footprint.

Lignin has previously been used in the production of polyurethanes. For example, polyurethane foams have been produced by adding lignin as an organic charge in the polyol-isocyanate mixture. In another process, lignin was dispersed in the polyol containing resin prior to mixing the resin with the isocyanate.

Various methods have been described to incorporate the lignin in the polyurethane products.

Lignin can be dissolved in solvent and then mixed with isocyanate or polyol such as described in WO 2011/097719, WO 99/51654, WO 95/34392, U.S. Pat. Nos. 3,577,358, 3,072,634, 3,519,581, 4,851,457.

Alternatively the lignin can be dispersed in the isocyanate or polyol composition. Descriptions thereof can be found in WO 2011/097719, CZ 304264, WO 2013/179251, WO 96/32444, FR 2689366, WO 2014/044234.

For example in WO 2011/097719 the lignin is directly mixed in the isocyanate to form a suspension which is stable for at least 24 hours; over more extended periods of time separation or precipitation occurs.

WO 2015/055662 describes a dispersion of lignin in a halogenated polyol using a suitable milling process involving a solid grinding medium (hard objects made for example of flint, steel, glass or ceramic) not permanently connected to the mill. The polyol is preferably a brominated rigid polyether polyol. The dispersed lignin preferably has a (d90) mean particle size of less than 100 µm and is used in an amount of up to about 50% of the halogenated polyol. The lignin dispersion can then be used together with other polyols in rigid foam formulations. The resulting foams have improved flammability properties and the lignin is said to have no negative effect on thermal insulation properties.

WO 2014/044234 describes a method for preparing polyurethane materials through the reaction of polyol with isocyanate with lignin added in at least one reaction component, primarily the polyol component whereby the powder lignin particles are reduced in a dispersion device to the size of nanometres to micrometres.

WO 2013/179251 describes dispersions of lignin in polyol wherein the average particle size of the lignin is about 100 to about 2000 nm.

Also prepolymers can be formed containing the lignin, see CA 2164490 and WO 2014/044234.

However, a number of these processes present drawbacks, including for example a high cost production or a cost superior to petroleum derived raw materials, difficulties to regulate the viscosity, instability issues (stability limited to max. 24 hours) and/or difficulties to prepare polyurethanes containing relatively high quantities of lignin, use of halogenated materials, use of solvents.

Therefore it is an object of the present invention to provide a lignin-containing composition with improved characteristics, e.g. with improved stability, flammability, processability, particle size and/or particle size distribution.

It is also an object of the present invention to provide such a lignin-containing composition that can be used in various polyurethane applications including rigid foams and in particular as adhesives for structural wood. It is a further object to provide such a lignin-containing composition that provides improved properties when used in polyurethane applications, including as adhesive with improved modulus, strength and gap-filling properties.

Structural wood is a generic name for a range of composite wood products all with the key feature that they are structural load-bearing components and are often made by bonding timber and/or other wood composites together. The range of products include glulam, laminated veneer lumber, oriented strand lumber, timber strand or parallam, I-beams, parallel strand lumber and cross-laminated timber. Such structures can be tens of metres long, often achieved by finger-jointing individual pieces together.

Polyurethane products are well known for their strength and versatility in structural wood adhesive applications, suitable for exterior as well as interior applications. They offer many technical and engineering advantages including     Exceptionally strong bonding of wood and superior ageing properties Adaptable curing speeds that can be fine tuned to suit fast and slow cure assembly techniques Good, deep wetting and uniform penetration properties creating a large bonding interface Excellent reactivity with water naturally occurring in wood, creating strong crosslinks that add to overall adhesive strength Two-component isocyanate-based adhesives provide a high degree of control of component viscosities, stabilities, reactivities and performance and good processability. However, such resin systems do require good mixing at the specified ratio and require constant monitoring during production. One-component moisture-cured urethane-based adhesives are also used, relying on the moisture in the wood, atmosphere or applied as a spray for cure. Application and processing is easier as the resin does not need mixing.

As most applications of structural wood composites, such as glulam and I-beams, are load-bearing they are subject to stringent codes and standards. These tests range from initial strength and bending moduli of assemblies to long-term endurance and creep testing. Tests can include glueline thickness assessments and aggressive short-term hydrolytic ageing assessments. Particularly relevant standards include EN 301, EN 302-1, EN 302-2, EN 302-4 and EN 15416-2.

In general the current polyurethane wood adhesives do not pass all these norms. Shear strength and bending modulus is generally used as a reliable parameter for the evaluation of adhesive bond strength in solid wood because it is the most common interfacial stress under service conditions.

Strength of thick glue lines, for example, is one of the major shortcomings. Lap shear strength required by the standard cannot be obtained by a neat isocyanate based resin; fillers such as fumed silica need to be added to the resin in order to improve the lap shear strength. Relatively high concentrations of fillers are required; these increase the cost of the resin significantly and have significant manufacturing problems (low density bulk of powder) giving rise to physical instable yet very viscous systems which are difficult to handle.

An improvement in this performance (especially when inexpensive) would be a major advantage.

It is therefore another aim of the present invention to provide a polyurethane adhesive with improved wood-to-wood bonding strength, modulus and adhesion performance, particularly gap-filling properties.

Accordingly, one aspect of the present invention concerns a composition comprising lignin dispersed in a polyisocyanate wherein the (d90) mean particle size of the dispersed lignin is at most 5 µm, preferably less than 5 µm, more preferably less than 2 µm, most preferably less than 1 µm.

According to one aspect of the invention lignin is incorporated into the polyurethane ingredients by dispersing lignin directly in the isocyanate-based resin such that the average mean particle size of the dispersed lignin is reduced from generally more than 50 µm to below 5 µm.

Such a smaller lignin particle size leads to better interaction/reaction of lignin with isocyanate, more stable lignin dispersions (no sedimentation, even after a longer period of time), higher viscosity (no need to add filler to increase viscosity for some structural adhesive applications) and more consistent performance results in the various polyurethane applications. Indirectly, material flaws in the polyurethane glues are minimized because of the smaller particles. Also in general the addition levels of the lignin in various polyurethane materials is lower.

By dispersing the lignin in isocyanate resin, the lignin (partially) reacts with isocyanate and is incorporated into the network and this can be regarded as a benefit over dispersing the lignin in the polyol wherein it is not readily reacting.

The inventive composition has a mean particle size distribution d90—meaning that 90% of the sample's mass is comprised of smaller particles than the given value—of equal to or below 5 µm—of the lignin. An indication of the particle size can be obtained by studying the dispersion using a Zeiss Jenavert Interphako microscope equipped with a DeltaPix camera. Alternatively the grossness of the dispersion can be measured using a Zehntner-Grindometer ZGR2021. This grindometer allows to measure grossness between 0 µm and 50 µm and indicates the largest particles present in the dispersion.

Reducing particle size to a certain extent is beneficial because of an increase in surface area, resulting in a better compatibility with the isocyanate and higher reactivity due to increased accessibility of the hydroxyl groups.

However preferably at least 50% of the lignin particles should have a particle size larger than 500 nm. Smaller particles than that will lead to lower performance enhancements, in particular related to modulus, gapfilling performance and delamination resistance.

Another aspect of the present invention is a process for the production of the inventive composition using a three roll mill or triple roll mill.

A three roll mill is a machine that uses shear force created by three horizontally positioned rollers rotating at the same speed in opposite directions relative to each other, in order to mix, refine, disperse, or homogenize viscous materials fed into it.

The gap distance between the three adjacent rollers (called the feed roller, centre roller and apron roller) is usually mechanically adjusted. Material, usually in the form of a paste, is fed between the feed and centre rollers. In the first gap, the paste is roughly dispersed and particles/agglomerates crushed (due to high shear forces). The obtained substance sticks then to the bottom of the centre roller which transports it into the second gap. In this gap, the paste is dispersed to a higher degree of fineness (due to the smaller distance of the second gap compared to the first one and therefore higher shear force). The scraper system then removes the processed material from the apron roller.

To maximise the dispersion quality, the milling cycle can be repeated several times by gradually decreasing the gap distance and achieve the desired level of particle size.

Particular advantages of this process are the possibility to mill pastes with high viscosities, as well as to carefully control the temperature of the material, since this latter is processed as a thin film on the roller. The paste can possibly be cooled or heated to the desired temperature. A notable disadvantage is that the large open area on the rollers might cause loss of volatiles present in the material.

In case isocyanate-based materials are processed, it is advisable to use a nitrogen blanket. Typical parameters used are:

| | Size gap 1 (µm) | Size gap 2 (µm) | Speed (rpm) |
| --- | --- | --- | --- |
| Pass 1 | 60 | 20 | 600 |
| Pass 2 | 30 | 10 | 600 |
| Pass 3 | 15 | 5 | 600 |

Before processing into the three roll mill, lignin-containing dispersions are preferably pre-treated as follows: 1) wetting of the lignin in the dispersant using a spatula, 2)

mixing using a Heidolph mixer and Cowles blade (30 minutes—3000 rpm—under nitrogen blanket).

The inventive process allows reducing the particle size of the lignin thereby improving the characteristics of the composition and the stability of the dispersion.

The lignin to be used according to the present invention can be derived from all possible sources of lignin including but not limited to hardwood and softwood trees, woody plants, grasses, including canes and bamboo, cereals crops (wheat straw, barley straw, maize, flax, hemp) and shrubs. Further the lignin can be derived from virgin sources of lignocellulosic materials or from industrial waste or even post consumer waste lignocellulosic feedstocks.

The lignin can be an alkali lignin, Kraft lignin, Klason lignin, hydrolytic lignin, enzymic mild acidolysis lignin, organosolv lignin, steam explosion lignin, milled wood lignin, lignin sulphite, lignin sulphates (lignosulphonates) particularly of Ca, Na, Mg, K and Black Liquor, or any mixture thereof.

Preferably the lignin for use in the present invention should be free or have very low levels of ash content (preferably below 1 wt % or even below 0.5 wt %, most preferred below 0.1%), sulphur content (preferably below 1 wt %, more preferred below 0.5 wt %, most preferably sulphur free) and also ion content. Preferably the content of each of sodium, potassium, calcium and magnesium is below 0.03 wt % (300 ppm), more preferred below 50 ppm, most preferred below 5 ppm. The lignin used may need to be modified in order to comply with the above requirements. Further the lignin should generally have a number average molecular weight in the range 300 to 8000, more preferred in the range of 400 to 4000 and most preferably in the range 500 to 2000.

Certainly in case of dispersion of lignin in isocyanate it is very important that the lignin has very low specifications in terms of ash and/or sulphur and/or ion content. If not, the dispersion will not be stable due to side reactions taking place (iso-iso reactions) which can lead to very high viscosities and hence the dispersion may no longer be processable.

An example of the source of lignin for use in the invention is the lignin known as Organosolv lignin produced by the so-called organosolv process (see U.S. Pat. Nos. 4,100,016 and 4,764,596). As possible examples of commercially available organosolv lignin one may cite Alcell (available from Lignol Innovations). Alternatively the lignin is a Kraft lignin such as LignoBoost or LignoForce.

Preferably the lignin is dried prior to use and has a moisture content of less than 1 wt %, especially when intended for use in a non-blowing application.

The moisture content in the dried lignin may vary depending on the intended application of the final polyurethane product. In one embodiment, the lignin or lignins are dried such that the water percentage in weight of the total weight of the lignin varies from about 0 to about 10 wt %. In another embodiment, the moisture content of the dried lignin varies from about 0 to about 5 wt %. It can preferably vary from about 0 to about 2 wt %. Most preferably, the moisture content of the dried lignin is less than about 1.0 wt %. In the present description, the expressions "moisture content" and "water content" are used interchangeably to refer to the percentage of water in the dried lignin, which is expressed in weight of the total weight (wt) of the lignin and measured by moisture balance with a top heater at 105° C.

The drying of the lignin can be performed using any known method in the art, including, for example, using a flash dryer, a spray dryer, an oven, a forced air convection oven, a mechanical press, freeze-drying etc. In some embodiments, the lignin is received as a pre-dried lignin, for example with a moisture content in weight of the total weight (wt) of the lignin of about 10 wt %, and is further dried before dispersing using a flash dryer or oven so as to reach a moisture content of about 1.0 wt % or less.

The polyisocyanates for use in the present invention to obtain the claimed composition can be any isocyanate used in known processes for synthetizing polyurethanes. The nature of the isocyanate will depend on the application which is intended for the polyurethane product and a person skilled in the art will choose the isocyanate accordingly. The isocyanate(s) is(are) in liquid form. Mixtures of various polyisocyanates can be used.

The polyisocyanate may be any organic polyisocyanate compound or mixture of organic polyisocyanate compounds, provided said compounds have at least 2 isocyanate groups. Blocked polyisocyanates wherein the isocyanate groups are present in a latent form, can also be used. Organic polyisocyanates includes diisocyanates and isocyanates of higher functionality. Examples of organic polyisocyanates which may be used in the present invention include aromatic isocyanates such as m- and p-phenylene diisocyanate, tolylene-2,4- and -2,6-diisocyanate, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-triisocyanatodiphenylether. Examples of aliphatic polyisocyanates include hexamethylene diisocyanate, isophorone diisocyanate, methylene bis(4-cyclohexylisocyanate). Modified polyisocyanates containing isocyanurate, carbodiimide or uretonimine groups may be employed as well. The organic polyisocyanate may also be an isocyanate-ended prepolymer made by reacting an excess of a diisocyanate or higher functionality polyisocyanate with a polyol or polyamine. Mixtures of isocyanates may be used, for example a mixture of tolylene diisocyanate isomers such as the commercially available mixtures of 2,4- and 2,6-isomers and also the mixture of di- and higher polyisocyanates produced by phosgenation of aniline/formaldehyde condensates. Such mixtures are well-known in the art and include the crude phosgenation products containing methylene bridged polyphenyl polyisocyanates, including diisocyanate, triisocyanate and higher polyisocyanates together with any phosgenation by-products. Preferred isocyanates to be used in the present invention are those wherein the isocyanate is an aromatic diisocyanate or polyisocyanate of higher functionality such as a pure diphenylmethane diisocyanate or mixture of methylene bridged polyphenyl polyisocyanates containing diisocyanates, triisocyanates and higher functionality polyisocyanates. Methylene bridged polyphenyl polyisocyanates are well known in the art. They are prepared by phosgenation of corresponding mixtures of polyamines obtained by condensation of aniline and formaldehyde. For convenience, polymeric mixtures of methylene bridged polyphenyl polyisocyanates containing diisocyanate, triisocyanate and higher functionality polyisocyanates are referred to hereinafter as polymeric MDI. Preferably the polyisocyanate is liquid at room temperature.

According to another aspect of the invention, lignin is dispersed in an isocyanate-reactive composition (generally a polyol composition) wherein the (d90) mean particle size of the dispersed lignin in the isocyanate-reactive composition is less than 5 μm, preferably less than 2 μm, most preferably less than 1 μm and subsequently pre-reacted with a stoichiometric excess of a polyisocyanate in order to prepare a so-called isocyanate-terminated prepolymer.

The particle size specified here is referring to the lignin particles in isocyanate-reactive composition. The size of the lignin particles in the obtained prepolymer (after reacting with isocyanate) is generally much higher (20-25 μm).

Isocyanate-reactive compounds to be used in the present invention include any of those known in the art for the preparation of polyurethanes. The nature of the isocyanate-reactive compound will depend on the application which is intended for the polyurethane product and a person skilled in the art will choose the isocyanate-reactive compound accordingly. The isocyanate-reactive compound(s) is(are) in liquid form. Mixtures of various isocyanate-reactive compounds can be used.

Of particular importance are polyols and polyol mixtures having average molecular weights of from 200 to 8000 and hydroxyl functionalities of from 2 to 8. Suitable polyols include reaction products of alkylene oxides, for example ethylene oxide and/or propylene oxide, with initiators containing from 2 to 8 active hydrogen atoms per molecule. Particularly preferred polyols are at least partially based on ethylene oxide, preferably in an amount of less than 75 wt %. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids, DMT-scrap or digestion of PET by glycols. Still further suitable polymeric polyols include hydroxyl-terminated polythioethers, polyamides, polyesteramides, polycarbonates, polyacetals, polyolefins and polysiloxanes.

Prior to pre-polymerisation, the isocyanate-reactive (polyol) composition containing generally up to 20 wt % lignin (previously processed by a three roll mill) is usually dried under vacuum at room temperature (final moisture content generally about 0.3 wt %). The lignin-containing prepolymer is prepared according to standard procedures. The required quantity of polyisocyanate (generally containing about 10 ppm thionyl chloride to prevent trimerisation) is heated up at 80° C. in a glass flask under nitrogen flow and with continuous stirring (using a Teflon blade at 250 rpm). Then the specified amount of the isocyanate-reactive (polyol) composition containing generally up to 20 wt % lignin is added. Temperature of the reaction should preferably be maintained at 80° C. After 2 hours of reaction, heating is stopped. After cooling down to room temperature, the prepolymer containing generally up to 10 wt % lignin is transferred to a vessel for storage and stored under nitrogen.

It should be noticed that it is also possible to disperse lignin in polyisocyanate, and subsequently react this composition with an isocyanate-reactive compound (preferably polyol) in a similar way as described above to obtain an isocyanate-terminated prepolymer.

Preferably such an isocyanate-terminated prepolymer has an NCO value of 13 to 20 wt %, contains about 10 wt % lignin and is based on an MDI as polyisocyanate, and a polyol of functionality 2 to 4, MW 1300 to 4000 and ethylene oxide content of maximum 75 wt %.

The inventive compositions further may comprise conventional additives. These additives should not react with the lignin nor the dispersing medium. Examples of additives useful for the intended product processing or applications or properties include viscosity reducers, catalysts, surfactants, flame retardants, and blowing agents. In some cases low viscosity flame retardants or blowing agents are also used as the viscosity reducer. Examples of flame retardant includes TCPP (tri(beta-chloropropyl)phosphate). Example of blowing (foaming) agent includes hydrocarbons, halogenated hydrocarbon, HFO, hydrochlorofluorocarbon HCFC, hydrochlorocarbon HCC, hydrofluorocarbon HFC and water.

The quantity of additives in the inventive composition can be adapted depending on the polyurethane product intended application.

The quantity of dried lignin used in the composition of the present invention will vary depending on intended application for the final polyurethane product. When the lignin dispersion is intended for use in structural adhesive applications generally from 1 to 20 wt %, or from 5 to 10 wt % lignin is dispersed in a polyisocyanate, depending on wood species, moisture content of the wood and resin loading.

Generally the composition according to the invention, optionally comprising additives as mentioned above, has a viscosity comprised between about 15 and about 100 Poise when dispersed in the polyisocyanate and between about 20 to about 1500 Poise when dispersed in the isocyanate-reactive composition and subsequently reacted with polyisocyanate to form a so-called prepolymer.

In another embodiment, the required viscosity is obtained by addition of viscosity reducers in the composition, such as low viscosity flame retardants and/or blowing agents.

Lignin is a biopolyol which contains reactive hydroxyl groups and one would expect that these groups would react with the isocyanate upon mixing these two products. Partial chemical reaction between the lignin and the isocyanate will occur, involving only the most readily available hydroxyl groups of the lignin. Hydrogen bonding between the lignin and the isocyanate may also be taking place. However, it was observed that under certain conditions, including drying the lignin (water content of 1 wt % or less) before dispersing in the polyisocyanate, the composition can remain stable long enough to be further processed. Hence, depending on the nature of the lignin and the nature of the polyisocyanate, the shelf life of the lignin/polyisocyanate composition of the present invention can extend from a few hours to a few days to a few weeks to a few months. Particularly if the ash content and ion content of the lignin is not low enough, shelf life will be limited due to side reactions. Lowest specifications are required to have a stable lignin-isocyanate dispersion. In case the residual water content of the lignin is too high, the water will react with isocyanate, forming urea which gives also rise to viscosity increase, resulting in limited stability. It is a particular benefit of the present invention that the shelf life of the lignin/polyisocyanate composition is generally several months.

Preferably, the composition according to the present invention is prepared under conditions where contact with moisture is limited, for example, in closed vessels and the time that tanks or reservoirs containing the composition are open to atmosphere is limited. Also a nitrogen blanket is generally applied during 3-roll milling process.

Once the present composition is obtained, it can either be directly used in the next step of the polyurethane production or stored for being used at a later time. In the latter case, the composition is preferably kept away from moisture in a hermetic container.

Yet another aspect of the present invention concerns the use of the compositions of the present invention, including any prepolymers derived therefrom, for the preparation of a polyurethane or a modified polyurethane product in various forms.

These polyurethane products obtained by the present invention include, without being limited to, rigid foams, flexible foams, rigid boards, rigid blocks, coatings, packagings, adhesives, binders, sealants, elastomers, thermoplastic polyurethanes or reaction injection moldings.

Incorporation of lignin, being a natural product, a by-product of the wood pulping and biofuel industry, into polyurethanes hence provides a more green polyurethane resin.

Besides the environmental advantage using the present compositions for the preparation of polyurethanes provides the following benefits:
  in structural wood adhesive applications: improved lap shear strengths, gap-filling properties and modulus
  in panel adhesives: decreased loading levels
  in rigid foam applications: improved modulus, strength and fire retardancy.

As previously mentioned, the process allows producing a large variety of different polyurethane products, not limited to the above mentioned products. A person skilled in the art will be able to select which lignin(s), polyisocyanate(s), polyol(s) and/or additives to be used, and their quantities, depending on the application which is required for the final polyurethane product.

The present process allows obtaining lignin based polyurethane products containing relatively large amounts of lignin. This allows reducing production costs since lignin is less expensive than polyols which can be used in smaller quantities than in conventional process or even be avoided. This also results in a smaller environmental footprint.

The process preferably does not require the use of any organic solvent as would other known processes. This is also beneficial for environmental and economic aspects.

In addition, the process does not require installing expensive new equipment. The same equipment as those known to produce polyurethane products, or with minor modifications, can be used. The process can thus be readily implemented, limiting investment required to use this technology.

Moreover, the process can be fine-tuned to fit almost any application.

A particularly preferred application for the compositions of the present invention, in particular the dispersions of lignin in polyisocyanate, lies in their use as structural wood adhesives.

Incorporation of lignin in the polyurethane-based wood adhesive according to the present invention gives rise to increased lap shear strengths and increased wood failure compared to the lignin-free polyurethane-based adhesives. Further modulus and gap-filling properties are improved.

Incorporation of lignin in wood adhesives improves lap shear strength and modulus in case of thin glue lines (0.1 mm) as well as thick glue lines (1 mm). Using the present composition in structural wood adhesives allows thick lines and even increases strength and modulus.

The fact that the lignin is dispersed in a polyisocyanate composition is a critical factor in order to obtain satisfactory gap-filling properties.

Besides lap shear strength and wood failure improvement, viscosity of the adhesive resin is increased significantly by incorporation of lignin which is beneficial for the structural wood adhesive application.

Incorporation of lignin further increases reactivity of the resin.

Incorporation of lignin improves delamination (e.g. incorporation of 5 wt % lignin reduces delamination almost to zero, >90% improvement compared to lignin-free systems).

To manufacture such a structural wood assembly, wood, usually freshly cut to the required dimensions, is dried to a specified moisture content and resin applied, typically 20 to 350 gr/m$^2$ for polyurethane resins. A second piece of wood or wood composite is then brought into contact with the resin coated piece and the two pieces, or more in the case of glulam, are pressed together. The pressing step can be very short, a few seconds in the case of I-beams or relatively long, several hours in the case of glulam. Generally, no heat is applied and the components are required to cure at room temperature, or only slightly elevated temperatures. Wood species typically used are spruce, douglas fir, beech, northern redwood and cedar. The resin is spread on the surface of precut and conditioned wood. The wood is generally of large dimensions. The resin can be applied as a ribbon coating, curtain coating, brushes, knives, drum roller transfer or any other commonly used resin application method. The wood pieces are then stacked regularly (e.g. LVL, glulam and CLT—in the latter case, the different layers of wood are laid up perpendicular to the preceding layer—crossgrain stacking) or irregularly (e.g. parallam, OSL) on top of each other, compressed (in a press) and usually allowed to cure at room temperature or modest temperatures (typically up to 50° C.). The resins are then allowed to cure—the rate of cure depends on the resin quality used, but cure is usually achieved within 24 hours.

The following examples are exemplary and not limiting.

EXAMPLE 1

Lap Shear Properties (Glue Line Thickness of 0.1 mm) when Dispersing Lignin Directly in the Isocyanate-based Resin Adhesive preparation: 20 wt % of dried Organosolv lignin (Alcell, Moisture Content 1 wt %) was dispersed into Suprasec 2144, an isocyanate-based resin of NCO value 15% available from Huntsman, in the following manner. A pre-weighted amount of lignin was mixed into the required amount of resin using a spatula until all particles were wetted. The mixture was stirred under nitrogen using a Heidolph mixer fitted with a Cowles blade at 3000 rpm for 30 minutes. Subsequently the 20 wt %-lignin-containing resin was processed by a three roll mill (model 80E from EXAKT) in three passes. For the three passes, the speed of the rollers was kept constant at 600 rpm, while the gap distance between the rollers was gradually decreased: for the first gap, from 60 µm to 30 µm and until 15 µm, and for the second gap from 20 µm to 10 µm and until 5 µm. The processed resin containing 20 wt % lignin was then further diluted to 10 wt %, 5 wt % and 1 wt %, respectively, using a Heidolph mixer fitted with a Teflon blade at 1500 rpm for 15 minutes under nitrogen. The isocyanate-based resins containing various lignin concentrations were stored in sealed glass bottles under nitrogen at room temperature.

Quality of the obtained resins with various lignin concentrations was evaluated using optical microscopy, viscosity and particle size measurements. An indication of the particle size was obtained by studying the dispersion using a Zeiss Jenavert Interphako microscope equipped with a DeltaPix camera. The viscosity was measured using a Brookfield R/S-CPS-P2+ rheometer fitted with a cone spindle (C25-2) for reference resin, or a plate spindle (P50) (with a gap of 85 microns) for lignin-containing resin. The measurements were performed at 25° C. and at a controlled shear stress. The stress was increased from 0 to 350 Pa in 1 minute, then kept constant at 350 Pa for 1 minute and subsequently decreased again to 0 Pa in 1 minute. Casson regression was applied to analyse the data. The viscosity of the resin was defined from the second step at a constant shear stress of 350 Pa.

The results are presented in Table 1 below.

| Lignin concentration in Suprasec 2144 (wt %) | Viscosity (Poise) | Particle size |
|---|---|---|
| 0 | 16 | — |
| 1 | 20 | 5 μm |
| 5 | 27 | 5 μm |
| 10 | 35 | 5 μm |
| 20 | 70 | <5 μm |

Table 1

Preparation of lap joints: Lap joints were prepared using tangential cut beech or pine wood (150×20×5 mm). Wood was pre-conditioned in a climate chamber (22° C., 55% relative humidity) for at least one week, in order to obtain a moisture content of 10±0.5% and 14±0.5% respectively. Moisture content was measured using a Sartorius moisture balance. Lap joints were made with an overlap of 20×20 mm and a resin loading of 500 g/m$^2$ (0.2 g of resin) or 125 g/m$^2$ (0.05 g of resin) applied on one substrate face by means of a brush. Before applying the glue, the wood surfaces were sanded with abrasive paper (P100) and dust removed. Resin was degassed in a SpeedMixer™ DAC 400.1 V-DP (2.5 minutes, 2500 rpm, 100% vacuum). Two series of 6 lap joints were usually prepared per lignin concentration for each condition. The lap joints were then pressed between 2 metal plates using spacers of 9.00±0.05 mm, resulting in a compression of 11-12%, and cured in a climate chamber (22° C., 55% relative humidity). After 24 hours, pressure was released and the lap joints further cured for 7 days under the same climate conditions.

Lap shear test: Lap joints were tested at 22° C. according to a modified method of the EN302-1 standard. Lap shear strength was measured using an Instron 5566 Universal Testing Machine and a crosshead speed of 50 mm/min. The extent of wood failure was assessed after breaking the sample. Two series of 6 lap joints per lignin concentration and condition were usually tested (total 12 samples), obtaining an average result of 12 values.

Results: Shear strength measured for beech lap joints prepared with 10 wt % Organosolv lignin-containing isocyanate-based resin (nominal glue line thickness of 0.1 mm) was found to be 10.4 MPa whereas for lap joints prepared with the lignin-free resin, a lap shear strength of 5.6 MPa was measured (improvement of 86%). Additionally wood failure was found to be increased from 0 to 45% by the incorporation of 10 wt % Organosolv lignin.

The moisture content of the beech wood was 10% and the resin loading was 500 g/m$^2$. Independently of the wood species (pine or beech), resin loading (500 or 125 g/m$^2$) or wood moisture content (10 or 14%), incorporation of lignin resulted in improved lap shear strength. Results are presented in Table 2 below.

TABLE 2

| | Beech wood MC 10%-500 g/m$^2$ resin | | | | Pine MC 10%-500 g/m$^2$ resin | | | |
|---|---|---|---|---|---|---|---|---|
| Lignin loading | Stress @ max load (MPa) | | Wood failure | % | Stress @ max load (MPa) | | Wood failure | % |
| (wt %) | Average | St Dev | (%) | improvement | Average | St Dev | (%) | improvement |
| 0 | 5.6 | 0.1 | 0 | — | 7.4 | 0.6 | 40 | — |
| 1 | 7.1 | 0.6 | 10 | 27 | 7.7 | 0.6 | 65 | 4 |
| 5 | 9.5 | 0.1 | 40 | 70 | 8.6 | 0.8 | 75 | 16 |
| 10 | 10.4 | 1.8 | 45 | 86 | 9.1 | 0.7 | 65 | 23 |
| 20 | 9.4 | 0.7 | 90 | 68 | 10.0 | 0.7 | 85 | 35 |

| | Beech wood MC 10%-125 g/m$^2$ resin | | | | Beech wood MC 14%-500 g/m$^2$ resin | | | |
|---|---|---|---|---|---|---|---|---|
| Lignin loading | Stress @ max load (MPa) | | Wood failure | % | Stress @ max load (MPa) | | Wood failure | % |
| (wt %) | Average | St Dev | (%) | improvement | Average | St Dev | (%) | improvement |
| 0 | 4.7 | 1.0 | 0 | — | 7.0 | 1.0 | 0 | — |
| 1 | 8.1 | 1.5 | 60 | 72 | 11.0 | 1.4 | 50 | 57 |
| 5 | 7.5 | 1.5 | 60 | 60 | 10.2 | 0.6 | 85 | 46 |
| 10 | 8.8 | 1.1 | 90 | 87 | 11.2 | 1.3 | 90 | 60 |
| 20 | — | — | — | — | — | — | — | — |

EXAMPLE 2

Gap Filling Properties (Glue Line Thickness of 1 mm) when Dispersing Lignin Directly in the Isocyanate-based Resin Adhesive preparation: same as in Example 1

Figure 1:
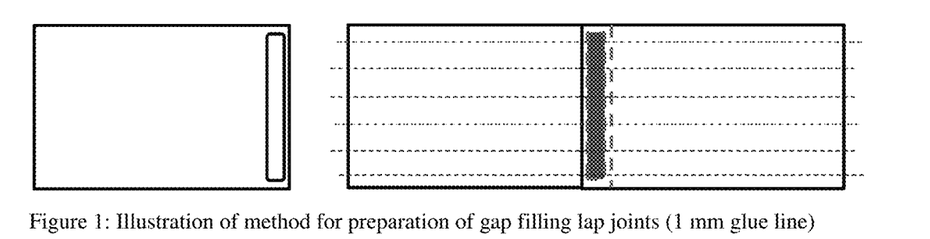
FIG. 1 shows an illustration of method for preparation of gap filling lap joints (1mm glue line).
Figure 2:
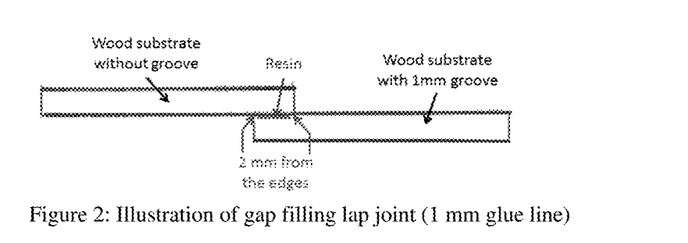
FIG. 2 shows an illustration of gap filling lap joint (1mm glue line).

Preparation of lap joints: Lap joints were prepared using tangentially faced beech or pine planks (150×110×5 mm). Wood was pre-conditioned in a climate chamber (22° C., 55% relative humidity) for at least one week, in order to obtain a moisture content of 10±0.5%. Moisture content was measured using a Sartorius moisture balance. In half of the planks, a 140 mm long, 10 mm width and 1 mm deep groove (2 mm from the edges) was carved (see FIG. 1). The wood surface was sanded with abrasive paper (P400) and dust removed. In case no lignin was used, 2 wt % of fumed silica (CAB-O-SIL TS720) was dispersed in the resin (using a Cowles blade at 1500 rpm for 10 minutes) as viscosity builder. Resin was degassed in a SpeedMixer™ DAC 400.1 V-DP (2.5 minutes, 2500 rpm, 100% vacuum). A second piece of wood with similar dimension but without a groove was then glued to the first by filling the groove with resin. The second piece was placed at 2 mm from the groove, as shown in FIG. 2. The billet was then pressed between 2 metal plates using a controlled gap of 9.50±0.05 mm, resulting in a compression of 9-10%, and cured in a climate chamber (22° C. and 55% relative humidity). After 24 hours, the pressure was released and the billet further cured in the climate chamber (same parameters) for 7 days. The billet was then cut along the length into 5 strips of 20 mm width (edges of the billet excluded), obtaining 5 gap filling lap joints (see FIG. 2). 2 series of 5 lap joints were usually prepared per lignin concentration.

Lap shear test: Lap joints were tested at 22° C. according to a modified method of the EN302-1 standard. Lap shear strength was measured using an Instron 5566 Universal Testing Machine and a crosshead speed of 50 mm/min. The extent of wood failure was assessed after breaking the sample. Two series of 5 lap joints per lignin concentration were usually tested (total 10 samples), obtaining an average result of 10 values.

Results: Shear strength measured for beech lap joints prepared with 20 wt % Organosolv lignin-containing isocyanate-based resin (nominal glue line thickness of 1 mm) was found to be 6.8 MPa whereas for lap joints prepared with the lignin-free resin a strength of 4.4 MPa was measured (improvement of 55%). Additionally wood failure was found to be increased from below 5% to 15% by the incorporation of 20 wt % Organosolv lignin. A minimum amount of 10 wt % lignin is required for this particular formulation in order to improve shear strength of lap joints with a 1 mm nominal glue line thickness. The results are presented in Table 3 below.

EXAMPLE 3

Delamination Resistance of Mini-glulams when Dispersing Lignin Directly in the Isocyanate-based Resin Adhesive preparation: same as in Example 1

Figure 3:
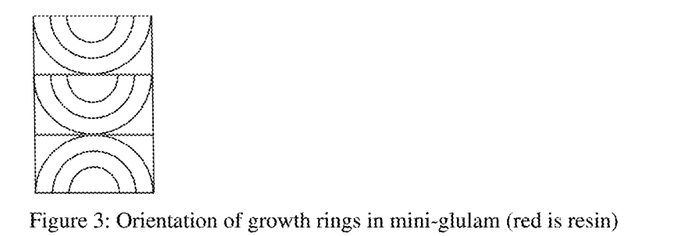
FIG. 3 shows orientation of growth rings in mini-glulam (red is resin).

Preparation of mini-glulams: Wood assemblies were made of 3 tangentially faced beech wood layers (2 glue lines). Each wood layer had a dimension of 220×70×20 mm. Wood was pre-conditioned in a climate chamber (22° C., 55% relative humidity) for at least one week, in order to obtain a moisture content of 10±0.5%. Moisture content was measured using a Sartorius moisture balance. Before gluing, the wood surfaces were sanded with abrasive paper (P400) and dust removed. A resin loading of 250 g/m² was applied on 2 of the 3 pieces (top face only) using a brush. The wood layers were oriented to get 2 layers with the growth rings in the same direction, and the bottom layer with the grow rings in the opposite direction (see FIG. 3). The assembly was then pressed in a laboratory Schwabenthan press at room temperature for 24 hours using a specific pressure of 2.2 bars. After the pressure was released, the wood assembly was allowed to further cure in a climate chamber (22° C., 55% relative humidity) for at least 7 days.

After cutting of the edges of the wood assembly (from 1 to 2 cm), 4 mini-glulams of 40×50×60 mm were cut out. Two wood assemblies were usually prepared per lignin concentration, resulting in 8 samples.

Delamination test: Mini-glulams were tested according to a modified method of the ASTM standard D2259, in a 3-cycle sequence described below:

| | |
|---|---|
| 1st cycle | 1. The mini-glulams were immersed in water at 22° C. in a vacuum oven.<br>2. A vacuum was drawn and held for 5 minutes.<br>3. The vacuum was released and the samples were left in water in the vacuum oven for 1 hour.<br>4. Number 2 and 3 were repeated.<br>5. The mini-glulams were dried in an oven at 65° C. for 22 hours. |
| 2nd cycle | 6. The mini-glulams were immersed in boiling water for 40 minutes.<br>7. The mini-glulams were dried in an oven at 65° C. for 22 hours. |
| 3rd cycle | 8. The mini-glulams were immersed in water at 22° C. in a vacuum oven.<br>9. A vacuum was drawn and held for 5 minutes.<br>10. The vacuum was released and the samples were left in water in the vacuum oven for 1 hour.<br>11. Number 9 and 10 were repeated.<br>12. The mini-glulams were dried in an oven at 65° C. for 22 hours. |

After each cycle, the two glue lines of each mini-glulam were visually assessed for signs of delamination. Delamination is expressed as percentage of the total glue line length:

$$D = \frac{l_1}{l_2} \times 100$$

Where D=the delamination in percent
$l_1$=the total delamination length in mm
$l_2$=the total length of the glue line in mm

TABLE 3

| Lignin loading (wt %) | Stress @ max load (MPa) Average | Stress @ max load (MPa) St Dev | Wood failure (%) | % improvement |
|---|---|---|---|---|
| 0 | 4.4 | 0.3 | 0 | — |
| 1 | 4.0 | 0.4 | 0 | −9 |
| 5 | 4.2 | 0.4 | 0 | −5 |
| 10 | 5.8 | 0.3 | 5 | 32 |
| 20 | 6.8 | 1.0 | 15 | 55 |

Two series of 4 mini-glulams were usually prepared and tested per lignin concentration. For each of them, 2 percentages of delamination were calculated (1 delamination percentage per glue line—2 glue lines per mini-glulam), obtaining an average result of 16 values.

Results: Delamination percentage measured for beech mini-glulams prepared with 20 wt % Organosolv lignin-containing isocyanate resin was found to be 13.5% whereas for mini-glulams prepared with the lignin-free resin a delamination percentage close to 100% was measured. The results are presented in Table 4 below.

TABLE 4

| Lignin loading | Delamination (%) | |
|---|---|---|
| (wt %) | Average | St Dev |
| 0 | 94.2 | 11.5 |
| 1 | 100.0 | 0.0 |
| 5 | 50.0 | 0.0 |
| 10 | 68.7 | 2.5 |
| 20 | 13.5 | 8.2 |

EXAMPLE 4

Lap Shear Properties (Glue Line Thickness of 0.1 mm) when Dispersing Lignin in the Isocyanate-reactive (Polyol) Segment of Resin before Prepolymerisation Adhesive preparation: 20 wt % of dried Organosolv lignin (Alcell, MC 1%) was dispersed into a mixture of Polyol A (functionality 2, MW 2000, 100% PO) and Polyol B (functionality 3.5, MW 3500, EO-tip of 15%) (50/50 wt ratio), polyol segment of the resin, in the following manner. A pre-weighted amount of lignin was mixed into the required amount of polyol mixture using a spatula until all particles were wetted. The mixture was stirred under nitrogen using a Heidolph mixer fitted with a Cowles blade at 3000 rpm for 30 minutes. Subsequently the mixture was processed by a three roll mill in six passes. For the first two passes, the speed of the rollers was kept constant at 200 rpm, while the gap distance between the rollers was gradually decreased: for the first gap, from 90 μm to 75 μm, and for the second gap from 30 μm to 25 μm. For the next three passes, the speed of the rollers was kept constant at 250 rpm, while the gap distance between the rollers was gradually further decreased: for the first gap, from 60 μm to 45 μm and until 30 μm, and for the second gap from 20 μm to 15 μm and until 10 μm. The same parameters as for the fifth pass were used for the last and sixth pass.

Figure 4:
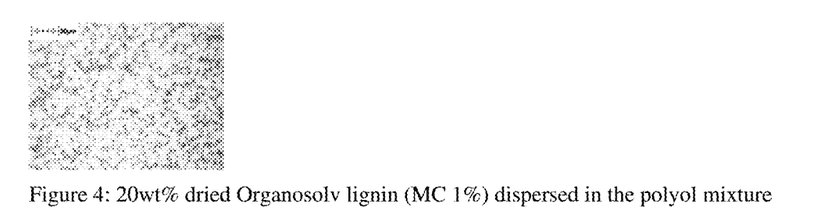
FIG. 4 shows 20 wt % dried Organosolv lignin (MC 1%) dispersed in the polyol mixture.

The quality of the 20 wt %-lignin-containing polyol mixture was evaluated using optical microscopy and particle size was determined to be less than 5 μm (see FIG. 4). Prior to pre-polymerisation, the 20 wt %- lignin-containing polyol mixture (after processing by a three roll mill) was dried under vacuum at room temperature (final MC 0.3%). The lignin-containing prepolymer was prepared according to the standard procedure. The required quantity of isocyanate (a uretonimine based isocyanate) (+10 ppm thionyl chloride to prevent trimerisation) was heated up at 80° C. in a glass flask under nitrogen flow and with continuous stirring (using a Teflon blade at 250 rpm). Then the specified amount of the 20 wt %-lignin-containing polyol mixture was added. Temperature of the reaction should be maintained at 80° C. After 2 hours of reaction, heating was stopped. After cooling down to room temperature (under nitrogen flow), a prepolymer containing 10 wt % lignin with a NCOv of 12% (referring to reaction between lignin and MDI) was obtained. This latter was then further diluted to 5 wt % and 1 wt % lignin using a Heidolph mixer fitted with a Teflon blade at 1500 rpm for 15 minutes under nitrogen. The prepolymers with various lignin concentrations were stored in sealed glass bottles under nitrogen at room temperature.

For 1 kg prepolymer was required: 525 g of the uretonimine based isocyanate and 475 g of 50/50 wt ratio mixture of Polyol A and Polyol B containing 20 wt % Alcell Organosolv lignin.

FTIR analysis of the prepolymer containing 10 wt % lignin has revealed formation of urethane bonds (1752 and 1725 cm$^{-1}$) resulting from the reaction between hydroxyl groups of lignin and MDI.

Quality of the obtained prepolymers with various lignin concentrations was evaluated using optical microscopy, viscosity and particle size measurements (see Table 5).

TABLE 5

| Lignin concentration in prepolymer (wt %) | Viscosity (Poise) | Particle size |
|---|---|---|
| 0 | 20 | — |
| 1 | 35 | 20-25 μm |
| 5 | 152 | 20-25 μm |
| 10 | 1257 | 20-25 μm |

Preparation of lap joints: Lap joints were prepared using tangential cut beech wood (150×20×5 mm). Wood was pre-conditioned in a climate chamber (22° C., 55% relative humidity) for at least one week, in order to obtain a moisture content of 10±0.5%. Moisture content was measured using a Sartorius moisture balance. Lap joints were made with an overlap of 20×20 mm and a resin loading of 500 g/m$^2$ (0.2 g of resin) applied on one substrate face by means of a brush. Before applying the glue, the wood surfaces were sanded with abrasive paper (P100) and dust removed. Resin was degassed in a SpeedMixer™ DAC 400.1 V-DP (2.5 minutes, 2500 rpm, 100% vacuum). Two series of 6 lap joints were usually prepared per lignin concentration. The lap joints were then pressed between 2 metal plates using spacers of 9.00±0.05 mm, resulting in a compression of 11-12%, and cured in a climate chamber (22° C., 55% relative humidity). After 24 hours, pressure was released and the lap joints were further cured for 7 days under the same climate conditions.

Lap shear test: same as in Example 1

Results: Shear strength measured for beech lap joints prepared with 5 wt % hardwood lignin-containing prepolymer (nominal glue line thickness of 0.1 mm) was found to be 9.2 MPa whereas for lap joints prepared with the lignin-free resin, a lap shear strength of 6.7 MPa was measured. Additionally wood failure was found to be increased from below 5% to 55% by the incorporation of 5 wt % hardwood lignin. The moisture content of the beech wood was 10% and the resin loading was 500 g/m$^2$. When lignin was dispersed into the isocyanate-reactive (polyol) segment of resin (prior to pre-polymerisation), the optimal lignin loading was lower than when lignin was directly dispersed in the isocyanate-based resin (see Table 6).

TABLE 6

| Lignin loading (wt %) | Stress @ max load (MPa) Average | St Dev | Wood failure (%) | % improvement |
|---|---|---|---|---|
| 0 | 6.7 | 0.7 | <5 | — |
| 1 | 7.4 | 0.9 | 15 | 10 |
| 5 | 9.2 | 0.9 | 55 | 37 |
| 10 | 7.9 | 1.1 | 55 | 18 |

EXAMPLE 5

Lap Shear Properties (Glue Line Thickness of 1 mm) when Dispersing Lignin Directly in the Isocyanate-based Resin without 3-roll Milling the Dispersion—Larger Particle Size Adhesive preparation: 1, 5 and 10 wt % of dried Organosolv lignin (Alcell, MC 1%) was dispersed into an isocyanate-based resin (Suprasec 2144) in the following manner. A pre-weighted amount of lignin was mixed into the required amount of resin using a spatula until all particles were wetted. The mixture was stirred under nitrogen using a Heidolph mixer fitted with a Cowles blade at 3000 rpm for 30 minutes.

Quality of the obtained dispersion with various lignin concentrations was evaluated using optical microscopy, viscosity and particle size measurements.

The particle size of the lignin was significantly higher for dispersions prepared by Heidolph mixing only compared to 3-roll milling, and viscosity is significant lower for high lignin concentrations (Table 7).

TABLE 7

| Lignin concentration in S2144 (wt %) | Viscosity (Poise) | Particle size |
|---|---|---|
| 0 | 16 | — |
| 1 | 17 | >25 μm |
| 5 | 26 | 15-20 μm |
| 20 | 42 | 15-20 μm |

Preparation of lap joints: see example 2
Lap shear test: see example 2

Results: Shear strength measured for pine lap joints prepared with 1, 5 and 10 wt % Organosolv lignin-containing isocyanate-based resin (nominal glue line thickness of 1 mm) was found to be on average respectively 2.2, 2.2 and 4.2 MPa, whereas for lap joints prepared with the lignin-free resin, an average lap shear strength of 1.5 MPa was measured (average improvement of respectively 39, 42 and over 100%). However a very wide spread in the results (>35% relative standard deviation) was obtained due to the low quality lignin dispersions (high particle size) whereas dispersion prepared using 3-roll milling show a relative standard deviation of <15% in the results. Strengths measured for 1 and 5 wt % lignin are in the worst case respectively 25 and 15% lower than the lignin-free system and in the best case both over 100% improved. When incorporating 10 wt % lignin, in all cases an improvement was observed (min. 37% and max over 300%). The results are presented in Table 8.

TABLE 8

| System | Stress @ max load (MPa) | | | | | Improvement (%) | | |
|---|---|---|---|---|---|---|---|---|
| | Avg | St Dev | St Dev (%) | low | high | av ref | high ref | low ref |
| S2144 | 1.6 | 0.1 | 7.7 | 1.4 | 1.7 | | | |
| S2144 + 1% Li | 2.2 | 0.9 | 42.6 | 1.2 | 3.1 | 39 | −26 | 115 |
| S2144 + 5% Li | 2.2 | 0.8 | 35.6 | 1.4 | 3.0 | 42 | −15 | 109 |
| S2144 + 10% Li | 4.2 | 1.9 | 45.8 | 2.3 | 6.1 | 172 | 37 | 329 |

EXAMPLE 6

Lap Shear Strength (Glue Line Thickness of 0.1 mm) when Dispersing Lignin Directly in the Isocyanate-based Resin Without 3-roll Milling the Dispersion—Larger Particle Size Adhesive Preparation:

5 and 10 wt % of dried Organosolv lignin (Alcell, MC 1%) was dispersed into an isocyanate-based resin (Suprasec 2144) in the following manner. A pre-weighted amount of lignin was mixed into the required amount of resin using a spatula until all particles were wetted. The mixture was stirred under nitrogen using a Heidolph mixer fitted with a Cowles blade at 3000 rpm for 30 minutes. The dispersion was split into two. Subsequently, one part of the dispersion was processed by a three roll mill as described in Example 1.

Preparation of lap joints: see example 1
Lap shear test: see example 1
Results:

Quality of the obtained dispersion with various lignin concentrations was evaluated using a Grindometer. The particle size of the lignin was significantly higher for dispersions prepared by Heidolph mixing only compared to 3-roll milling (see Table 9 below). Lap shear results of beech lap joints with a glue line thickness of 0.1 mm (MC of 10%) and prepared with a resin loading of 250 g/m² can be found in Table 9 below. Improvement in lap shear strength is much higher when dispersion is 3-roll milled. Also high percentages of wood failure are observed whereas for the dispersions prepared with Cowles blade only, no wood failure at all was obtained.

TABLE 9

| Lignin loading (wt %) | Dispersing method | Viscosity (Poise) | Particle size (μm) | Stress @ max load (MPa) Average | St Dev | Wood failure (%) | Improvement (%) |
|---|---|---|---|---|---|---|---|
| 0 | — | 19 | — | 5.4 | 0.5 | 0 | — |
| 5 | CB | 22 | 15-25 | 5.9 | 1.1 | 0 | 9 |
| 10 | CB | 24 | 15-25 | 5.0 | 0.8 | 0 | −7 |
| 0 | — | 19 | — | 5.4 | 0.5 | 0 | — |

TABLE 9-continued

| Lignin loading (wt %) | Dispersing method | Viscosity (Poise) | Particle size (μm) | Stress @ max load (MPa) | | Wood failure (%) | Improvement (%) |
|---|---|---|---|---|---|---|---|
| | | | | Average | St Dev | | |
| 5 | CB + 3RM | 49 | <1 | 8.9 | 0.6 | 30 | 65 |
| 10 | CB + 3RM | 63 | <1 | 9.2 | 0.7 | 72 | 70 |

Dispersing methods: CB = Cowles blade, CB + 3RM = Cowles blade + 3 roll-mill

The invention claimed is:

1. A composition comprising lignin dispersed in a polyisocyanate characterised in that the (d90) mean particle size of the dispersed lignin is less than 5 μm.

2. The composition according to claim 1, wherein at least 50% of the dispersed lignin particles have a particle size of at least 500 nm.

3. The composition according to claim 1, wherein the lignin is free of ash content, sulphur content, and/or ion content.

4. The composition according to claim 3, wherein the ash content of the lignin is below 1 wt %.

5. The composition according to claim 3, wherein the suphur content of the lignin is below 1 wt %.

6. The composition according to claim 3, wherein the content of each of sodium, potassium, calcium and magnesium in the lignin is below 0.03 wt %.

7. The composition according to claim 1, wherein the lignin is an organosolv lignin or a Kraft lignin.

8. The composition according to claim 1, wherein the lignin has a moisture content of less than 10 wt %.

9. The composition according to claim 1, wherein the polyisocyanate is an aromatic polyisocyanate.

10. The composition according to claim 1, wherein the amount of lignin is between 1 and 25 wt %.

11. A process for producing a composition as defined in claim 1 using a three roll mill.

12. An isocyanate-terminated prepolymer, wherein the prepolymer is the reaction product of a stoichiometric excess of a polyisocyanate with a composition comprising lignin dispersed in an isocyanate-reactive compound wherein the (d90) mean particle size of the dispersed lignin is less than 5 μm.

* * * * *